United States Patent Office 3,644,631
Patented Feb. 22, 1972

3,644,631
THERAPEUTIC METHODS UTILIZING ARYL
PYRROL-3-YL KETONES
Irwin J. Pachter, Woodbury, and Alan A. Rubin, Rockville Center, N.Y., assignors to Endo Laboratories Inc., Garden City, N.Y.
No Drawing. Continuation-in-part of application Ser. No. 584,762, Oct. 6, 1966. This application May 13, 1969, Ser. No. 824,284
Int. Cl. A61k 27/00
U.S. Cl. 424—274    8 Claims

ABSTRACT OF THE DISCLOSURE

Therapeutic compositions having anti-inflammatory, analgetic and antipyretic activities, and methods for relieving pain, reducing fever and alleviating inflammatory syndromes in mammals by means of such compositions, utilizing certain aryl pyrrol-3-yl ketones.

CROSS-REFERENCE TO RELATED APPLICATION

This application is a continuation-in-part of copending application Ser. No. 584,762 filed Oct. 6, 1966, now abandoned.

BACKGROUND OF THE INVENTION (1) Field of the invention

This invention relates to therapeutic compositions incorporating certain aryl pyrrol-3-yl ketones having valuable pharmacodynamic activity, and particularly anti-inflammatory, analgetic and antipyretic properties, and to methods for using such compositions for such purposes. In its preferred form, the invention relates to such therapeutic compositions and to their use in the treatment of mammals for alleviating inflammatory syndromes therein.

The aryl pyrrol-3-yl ketones of the type which may be utilized in the practice of the present invention may be represented by the formula:

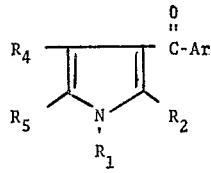

wherein
$R_1$ is hydrogen; lower alkyl, lower alkenyl or cycloalkyl having not more than six carbon atoms; benzyl, benzoyl, or phenyl; or halo-, (lower alkoxy)-, or (lower alkyl)-substituted benzyl, benzoyl or phenyl in which the lower alkoxy and lower alkyl substituents have not more than four carbon atoms;
$R_2$, $R_4$ and $R_5$ are hydrogen; lower alkyl, lower alkenyl or cycloalkyl having not more than six carbon atoms; phenyl or phenyl lower alkyl the alkyl moiety of which has not more than four carbon atoms; or halo-, (lower alkoxy)-, or (lower alkyl)-substituted phenyl or phenyl lower alkyl in which the lower alkoxy or lower alkyl moieties have not more than four carbon atoms.

Ar represents aryl or substituted aryl. Among the preferred aryl groups are phenyl, naphthyl and biphenyl. The aryl groups may be mono-, di-, or tri-substituted by groups chosen, for example, from the following: lower alkyl, lower alkanoyl, hydroxy or etherified hydroxy such as lower alkoxy, aryloxy, aralkoxy or lower alkylenedioxy, e.g., methoxy, ethoxy, isopropoxy, allyloxy, phenoxy, benzyloxy, methylenedioxy and the like.

Alternatively, the functional substituent on the aryl moiety may also be nitro, halo, amino, or substituted amino, representative examples of the latter of which moieties include lower alkanoylamino, benzylideneamino, ketimino, urethano lower alkylamino lower dialkylamino, lower dialkylamino-N-oxide, ureido, amidino, hydrazino, alkoxyamino, sulfonamino or heterocycloamino, e.g., piperidino.

Furthermore, the functional substituents may be mercapto, or substituted mercapto such as lower alkylthio, e.g., methylthio and propylthio, or arylthio or aralkylthio, e.g., phenylthio or benzylthio.

The aryl group may bear halo-lower alkyl substituents such as trifluoromethyl, trifluoroethyl, perfluoroethyl or $\beta$-chloroethyl, or it may bear acyl moieties such as formyl, acetyl, propionyl, benzoyl, phenylacetyl and trifluoroacetyl.

Yet further, the aryl moieties of the aryl pyrrol-3-yl ketones of the type here involved may be substituted by lower alkyl sulfonyl, lower alkyl sulfinyl, sulfamyl, benzylthiomethyl, cyano, sulfonamido or dialkylsulfonamido.

Finally, the aryl radical may also contain a carboxy substituent or a derivative thereof, such as an alkali metal salt or a lower alkyl ester of the carboxyl moiety, or a carbonyl-azide, -amide, or -hydrazide, e.g., carbamoyl or substituted carbamoyl, carbazoyl, or lower alkoxycarbonyl such as ethoxycarbonyl group.

(2) Description of the prior art

Compounds of the above type have heretofore been prepared and subjected to biological evaluation by Gardner, Wenis and Lee [J. Org. Chem. 23 823 (1958)]. The compounds were reported to be "without pharmacological or chemotherapeutic interest."

SUMMARY OF THE INVENTION

Surprisingly, and contrary to the above noted publication, it has been found that aryl-pyrrol-3-yl ketones within the above class have outstanding anti-inflammatory, analgetic and antipyretic properties and may therefore be utilized in the therapeutic treatment of mammals for such purposes, particularly for alleviating the systems of rheumatic, arthritic and other inflammatory conditions.

In particular, those aryl pyrrol-3-yl ketones of the above type which are preferably employed in the therapeutic methods and compositions hereof are those wherein
$R_1$ is hydrogen; lower alkyl or cycloalkyl having no more than 6 carbon atoms; phenyl; benzyl; halo-, lower alkyl-, or lower alkoxy-substituted benzyl, the alkyl or alkoxy moieties of which have no more than 4 carbon atoms; or halo-substituted benzoyl;
$R_2$, $R_4$ and $R_5$ are hydrogen; lower alkyl, lower alkenyl or cycloalkyl having no more than 6 carbon atoms;

phenyl; halophenyl; or lower alkyl phenyl or phenyl lower alkyl, the alkyl moieties of which have no more than 4 carbon atoms; and Ar is phenyl; naphthyl; bisphenyl; or a mono-, di- or tri-substituted phenyl, the substituents of which are selected from the group consisting of hydroxy, lower alkyl, lower alkoxy, lower alkylenedioxy, phenoxy, nitro, halo, amino, lower alkanoylamino, benzylideneamino, lower alkylamino, di(lower alkyl)amino, ureido, lower alkylthio, phenylthio, halo lower alkyl, lower alkanoyl, lower alkyl sulfonyl, cyano, carbamoyl, N,N-di(lower alkyl) carbamoyl, lower alkoxycarbonyl, and heterocycloamino, in which the lower alkyl, lower alkoxy, lower alkylene or lower alkanoyl moieties have no more than 4 carbon atoms.

The indicated compounds are incorporated in effective amounts in pharmaceutically acceptable carriers and administered by any suitable route, e.g., orally, parenterally, by injection at the site of inflammation or other symptom, by topical administration or rectally. In oral administration, the preferred route, the compounds may be given in pure form; however, in view of the limited aqueous solubility of many of the compounds within the above class, it is advantageous to mix the same with conventional carriers such as starch, sugar, talc or the like to form powders which may be used directly, or inserted into gelatinous capsules or converted into tablets. When employed in tablet form, conventional additives such as lubricants, e.g., magnesium stearate; binders, e.g., gelatin; disintegrating agents, e.g., sodium carbonate in admixture with citric acid or the like may be incorporated with the active materials.

Unit dosage forms may contain varying concentrations depending upon the mode of administration of the active materials. Oral dosage forms may, for example, contain from 10 to 400 mg. of the active compounds, whereas topical ointments may have concentrations of the order of from as low as 0.25% to as much as 25% by weight. Effective dosages will, of course, depend upon the particular compound and host mammal to be treated. For example, it has been found that the compounds of the present invention are effective as anti-inflammatory agents at 1–100 mg./kg. p.o./rat, and at 5–10% of the active ingredient in an ointment, i.e., topically, in the rat; as antipyretics at 5–100 mg./kg. p.o./rat; and as analgetics at 5–200 mg./kg. p.o./mouse.

Many of the compounds of the present invention may be prepared by the reaction of an acid chloride with a Grignard derivative of an appropriate pyrrole, in accordance with the following reaction:

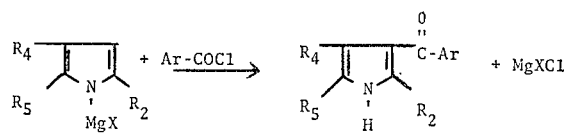

Alternatively, the desired aryl pyrrole may be prepared by a modification of the Vilsmeier-Haack Procedure as described by Klenispehn and Briod [J. Org. Chem., 26, 1652 (1961)]. The appropriate pyrrole may thus be reacted with an N,N-disubstituted arylamide, e.g., a morpholide having the desired aryl structure, in the presence of POCl₃, yielding the desired ketone as set forth in the following scheme:

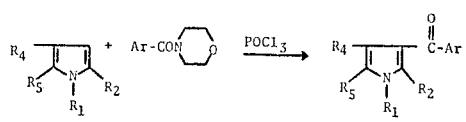

It has also been found useful to employ a new method of synthesis for the preparation of many of the compounds employed for the purposes of the present invention, such method involving a Friedel-Crafts reaction between a pyrrole and an acid chloride with boron trifluoride as the preferred catalyst, and proceeding as follows:

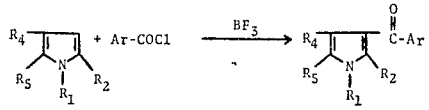

Useful N-benzoyl derivatives are occasional by-products of the Grignard reaction. For example, the reaction between 2,5-dimethylpyrrole and 2-chlorobenzoyl chloride produces 1-(2-chlorobenzoyl) - 2,5 - dimethylpyrrol-3-yl 2-chlorophenyl ketone, as set forth below:

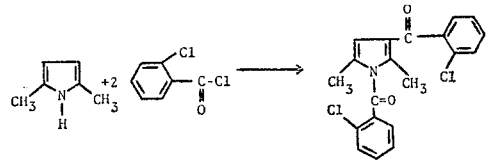

Examples 1–27 below illustrate the preparation of various of the aryl pyrrol-3-yl ketones which may be used in the therapeutic methods and compositions of the present invention and Examples 28–32 describe typical formulations in which such may be incorporated to provide the herein claimed therapeutic compositions. It will be noted that the temperatures specified in the several examples are given in degrees centigrade.

EXAMPLE 1

4-fluorophenyl 2,5-dimethylpyrrol-3-yl ketone and 2,5-diethylpyrrol-3-yl 4-fluorophenyl ketone To a Grignard solution prepared from 17.5 g. of magnesium, 79.2 g. of ethyl bromide and 300 ml. of ether is added, dropwise with stirring, 57.1 g. of 2,5-dimethylpyrrole in 50 ml. of ether. Stirring is continued for 20 minutes after completion of the addition. Next, 100 g. of 4-fluorobenzoyl chloride in 200 ml. of dry benzene is added over a 15-minute period. Stirring is then maintained for an additional two hours.

One hundred ml. of 25% aqueous ammonium chloride is added to quench the reaction. The organic layer is collected, washed with water, 10% aqueous sodium bicarbonate, again with water and dried. Concentration yields 115 g. (88% yield) of the product, (1.1) M.P. 120–125°. Recrystallization from benzene raises the M.P. to 129–130°.

Using 2,5-diethylpyrrole in place of 2,5-dimethylpyrrole, the foregoing procedure is used to prepare (1.2) 2,5-diethylpyrrol-3-yl 4-fluorophenyl ketone.

EXAMPLE 2

2,5-dimethylpyrrol-3-yl ketones from acid halides

By the procedure of Example 1, using appropriate acid halides in place of 4-fluorobenzoyl chloride, the following products are prepared:

(2.1) 2,5-dimethylpyrrol-3-yl phenyl ketone, M.P. 132–133°, from benzoyl chloride;

(2.2) 4-chlorophenyl 2,5-dimethylpyrrol-3-yl ketone, M.P. 156–158°, from 4-chlorobenzoyl chloride;

(2.3) 2-fluorophenyl 2,5-dimethylpyrrol-3-yl ketone, M.P. 143–145°, from 2-fluorobenzoyl chloride;

A 1 g. portion of this product is refluxed in 20 ml. piperidine for 20 hours, and on cooling the product is precipitated out with water. After two recrystallizations from benzene-hexane, (2.4) 2-piperidinophenyl 2,5-dimethylpyrrol-3-yl ketone, M.P. 151–152°, is obtained;

(2.5) 3-fluorophenyl 2,5-dimethylpyrrol-3-yl ketone, M.P. 141°, from 3-fluorobenzoyl chloride;

(2.6) 2,4-dichlorophenyl 2,5-dimethylpyrrol-3-yl ketone, M.P. 194–195°, from 2,4-dichlorobenzoyl chloride;

(2.7) 3,4-dichlorophenyl 2,5-dimethylpyrrol-3-yl ketone, M.P. 219–220°, from 3,4-dichlorobenzoyl chloride;

(2.8) 2,6 - dimethoxyphenyl 2,5 - dimethylpyrrol-3-yl ketone, M.P. 232–233°, from 2,6-dimethoxybenzoyl chloride;

(2.9) 3,4,5 - trimethoxyphenyl 2,5 - dimethylpyrrol-3-yl ketone, M.P. 155–156°, from 3,4,5-trimethoxybenzoyl chloride;

(2.10) 2,5-dimethylpyrrol-3-yl 1-naphthyl ketone, M.P. 165–167°, from 1-naphthoyl chloride.

The procedure of Example 1 is also used to prepare the following 2,5-dimethylpyrrol-3-yl ketones:

(2.11) the 4-benzyloxyphenyl ketone from 4-benzyloxybenzoyl chloride;

(2.12) the 2-allyloxyphenyl ketone from 2-allyloxybenzoyl chloride;

(2.13) the 4-phenylthiophenyl ketone from 4-phenylthiobenzoyl chloride;

(2.14) the 2-butylphenyl ketone from 2-butylbenzoyl chloride.

EXAMPLE 3

2,5-dimethylpyrrol-3-yl 3-nitrophenyl ketone from 3-nitrobenzoyl chloride

To a solution of 113.6 g. of boron trifluoride etherate, 100 ml. of anhydrous benzene and 74.2 g. of 3-nitrobenzoyl chloride is added 38.1 g. of 2,5-dimethylpyrrole. The reaction vessel is fitted with a drying tube and the mixture is permitted to stand for 72 hours. The contents of the vessel are poured onto 200 g. of ice and the water and the product crystallized. It is collected by filtration, dissolved in benzene, decolorized by passage through a short column of alumina and recovered by removal of the benzene. Recrystallization from ethanol gives 50.0 g. (52.4% yield) of the product (3.1), M.P. 223–224°.

EXAMPLE 4

2,5-dimethylpyrrol-3-yl ketones from acid halides

By the procedure of Example 3, using the appropriate acid halides in place of 3-nitrobenzoyl chloride, the following products are prepared:

(4.1) 2-methylphenyl 2,5-dimethylpyrrol-3-yl ketone, M.P. 146–147°;

(4.2) 3-methylphenyl 2,5-dimethylpyrrol-3-yl ketone, M.P. 172–174°;

(4.3) 4-methylphenyl 2,5-dimethylpyrrol-3-yl ketone, M.P. 137–139°;

(4.4) 3-trifluoromethylphenyl 2,5-dimethylpyrrol-3-yl ketone, M.P. 145–146°;

(4.5) 4-trifluoromethylphenyl 2,5-dimethylpyrrol-3-yl ketone, M.P. 146–146.5°;

(4.6) 2-methoxyphenyl 2,5-dimethylpyrrol-3-yl ketone, M.P. 140–141°;

(4.7) 4-methoxyphenyl 2,5-dimethylpyrrol-3-yl ketone, M.P. 102–103°;

(4.8) 2-naphthyl 2,5-dimethylpyrrol-3-yl ketone, M.P. 181–182°;

(4.9) 2,5-dimethylpyrrol-3-yl 4-nitrophenyl ketone, M.P. 195–196°.

The procedure of Example 3 is also used to prepare the following 2,5-dimethylpyrrol-3-yl ketones:

The (4.10) 4-phenoxyphenyl ketone, the (4.11) 3,4-methylenedioxyphenyl ketone, the (4.12) 4-methylthiophenyl ketone, the (4.13) 2-(N,N-dimethylcarbamoyl)-phenyl ketone, the (4.14) 4-methylsulfonylphenyl ketone, the (4.15) o-, (4.16) m- and (4.17) p-biphenylyl ketones, the (4.18) 4-propionylphenyl ketone, the (4.19) 4-carbethoxyphenyl ketone, the (4.20) 4-cyanophenyl ketone and the (4.21) 2-dimethylaminophenyl ketone.

EXAMPLE 5

2-hydroxyphenyl 2,5-dimethylpyrrol-3-yl ketone

A rapid stream of hydrogen chloride gas is passed into 200 ml. of pyridine until reflux ceases. A 5.0 g. portion of 2-methoxyphenyl 2,5-dimethylpyrrol-3-yl ketone is added. The resulting mixture is heated at 175–180° for two hours and then poured into 40 ml. of water. The aqueous solution is extracted five times with 20 ml. portions of ethyl acetate. The combined ethyl acetate extracts are evaporated. The residue is extracted with 10% aqueous sodium hydroxide. The resulting alkaline solution is treated with charcoal, filtered and acidified. The phenolic product (5.1) precipitates. It is recrystallized from ethanol and melted at 110.5 to 111.5°.

EXAMPLE 6

3- and 4-aminophenyl 2,5-dimethylpyrrol-3-yl ketones

A 10 g. portion of 2,5-dimethylpyrrol-3-yl 4-nitrophenyl ketone, 300 ml. of ethanol and 1.0 g. of 10% palladium on charcoal are combined and shaken under an atmosphere of 45 pounds of hydrogen for 20 minutes. Filtration of the catalyst and evaporation of solvent leaves the crystalline product, 4-aminophenyl 2,5-dimethylpyrrol-3-yl ketone (6.1), M.P. 152–153°.

By the same process, using 2,5-dimethylpyrrol-3-yl 3-nitrophenyl ketone, (6.2) 3-aminophenyl 2,5-dimethylpyrrol-3-yl ketone, M.P. 118–119°, is obtained.

EXAMPLE 7

4-formamidophenyl 2,5-dimethylpyrrol-3-yl ketone

The product of Example 6 is heated for five minutes with formic acid and the resulting solution poured into water. The crude formamide compound crystallizes, and upon recrystallization from dimethylformamide and water, (7.1) melts at 210–212°.

EXAMPLE 8

4-benzylideneaminophenyl 2,5-dimethylpyrrol-3-yl ketone

The product of Example 6 is heated in ethanol with an equimolar quantity of benzaldehyde in the presence of a drop of sulfuric acid. Concentration yields the benzylidene derivative (8.1).

EXAMPLE 9

4-benzylaminophenyl 2,5-dimethylpyrrol-3-yl ketone

The benzylidene compound of Example 8 is reduced with hydrogen in the presence of 10% palladium on charcoal by the method of Example 6 to produce the benzyl derivative (9.1).

EXAMPLE 10

2,5-dimethylpyrrol-3-yl 4-ureidophenyl ketone 4-aminophenyl 2,5-dimethylpyrrol-3-yl ketone is dissolved in dilute hydrochloric acid and heated with aqueous potassium cyanate to form the ureide (10.1).

EXAMPLE 11

1,2,5-trimethylpyrrol-3-yl phenyl ketone

A mixture of 56.8 g. of boron trifluoride etherate, 28.11 g. of benzoyl chloride, 21.8 g. of 1,2,5-trimethyl-pyrrole and 50 ml. of anhydrous benzene is allowed to stand for 72 hours in the absence of moisture. It is then stirred into 150 g. of ice and water. The organic layer is collected and concentrated. The residue is stirred for 30 minutes with aqueous sodium hydroxide to remove unchanged benzoic acid. Organic material is extracted into benzene. The benzene solution is dried and decolorized by passage through a column of alumina. Concentration of the benzene solution and cooling gives 36 g. of crude product which, after recrystallization from benzene, melts at 90–91° (11.1).

EXAMPLE 12

2,5-dimethyl-1-phenylpyrrol-3-yl phenyl ketone 2,5-dimethyl-1-phenylpyrrole, M.P. 50–51°, is allowed to react with benzoyl chloride under the conditions of Example 11. The product (12.1) melts at 129–130°.

EXAMPLE 13

1-cyclohexyl-2,5-dimethylpyrrol-3-yl phenyl ketone

Cyclohexylamine (1.1 mole) and acetonylacetone (1.0 mole) are heated under reflux in benzene in the presence of a few drops of concentrated sulfuric acid until water no longer forms. Distillation yields 1-cyclohexyl-2,5-dimethylpyrrole, M.P. 47–48°. The latter is converted into the product (13.1), M.P. 127–127.5°, by treating with benzoyl chloride under the conditions of Example 11.

EXAMPLE 14

1-benzyl-2,5-dimethylpyrrol-3-yl phenyl ketone and substituted derivatives thereof Benzylamine (1.1 mole) and acetonylacetone (1.0 mole) are heated under reflux in benzene in the presence of a catalytic amount of concentrated sulfuric acid until water no longer forms. Distillation yields 1-benzyl-2,5-dimethylpyrrole, M.P. 48–49°. The latter is converted into the product (14.1), M.P. 67–68°, by treating with benzoyl chloride under the conditions of Example 11.

In like fashion, starting with appropriately substituted benzylamines, the following are prepared:

(14.2) 1-(2-chlorobenzyl) - 2,5 - dimethylpyrrol-3-yl phenyl ketone;

(14.3) 1 - (4 - butylbenzyl) - 2,5 - dimethylpyrrol-3-yl 2-chlorophenyl ketone;

(14.4) 1-(3-ethoxybenzyl) - 2,5 - dimethylpyrrol-3-yl phenyl ketone.

EXAMPLE 15

2,4,5-trimethylpyrrol-3-yl phenyl ketone

A solution of 32.4 g. of benzoylacetone and 20.2 g. of 2,3-butanedione monoxime in 250 ml. of acetic acid and 30 ml. of water is treated with 40 g. of zinc dust. Heat evolves and the mixture comes to boiling. When the initial reaction subsides, the mixture is stirred and heated under reflux for 20 minutes. It is then poured onto ice. The precipitated product is collected and recrystallized from toluene (15.1); M.P. 174°.

EXAMPLE 16

2,4-dimethyl-5-propylpyrrol-3-yl phenyl ketone

Ethyl 5-propyl-2,4-dimethylpyrrole-3-carboxylate 100 g. is suspended in 800 ml. of 60% phosphoric acid and heated with stirring in a nitrogen atmosphere. The ester liquefies at 103° and at the same time is decarboxylated. Heating is continued at 103–108° for 30 minutes when the evolution of carbon dioxide ceases. The solution is poured on ice, neutralized with ice cold ammonia water, the oil which separates is taken up in ether, dried, and after evaporation of the solvent the residue is distilled in vacuo; 55 g. of 5-propyl-2,4-dimethylpyrrole, B.P.$_{16mm.}$ 85–88°, is obtained. The pyrrole is benzoylated with benzoyl chloride and boron trifluoride etherate in benzene according to the procedure of Example 3 to give the product (16.1), M.P. 152–153°.

EXAMPLE 17

2-benzyl-4,5-dimethylpyrrol-3-yl 2-fluorophenyl ketone

Methyl 2 - benzyl - 4,5 - dimethylpyrrole-3-carboxylate, M.P. 115–115.5°, is decarboxylated as described in Example 16 to yield 2-benzyl-4,5-dimethylpyrrole, M.P. 51–52°. The latter is converted into the (17.1) 2-fluorophenyl ketone with 2-fluorobenzoyl chloride by the method of Example 1.

EXAMPLE 18

2,4-dimethylpyrrol-3-yl phenyl ketone 4-benzoyl-3,5-dimethylpyrrole-2-carboxylic acid, M.P. 185–186° (decomposition), is decarboxylated in a nitrogen atmosphere by heating at the melting point until evolution of carbon dioxide ceases. The residual oil is diluted with toluene and cooled to give the product (18.1), M.P. 129–130° C.

EXAMPLE 19

2-methyl-5-phenylpyrrol-3-yl phenyl ketone; 5-(4-chlorophenyl)-2-methylpyrrol-3-yl phenyl ketone; 2,4-dimethyl-5-phenylpyrrol-3-yl phenyl ketone 2-methyl-5-phenylpyrrole is treated with boron trifluoride and benzoyl chloride in benzene by the procedure of Example 3 to yield 2-methyl-5-phenylpyrrol-3-yl phenyl ketone (19.1), M.P. 206–207°, after crystallization from ethanol.

In similar fashion 2-(4-chlorophenyl)-5-methylpyrrole, M.P. 125–126°, leads to (19.2) 5-(4-chlorophenyl)-2-methylpyrrol-3-yl phenyl ketone, and 2,4-dimethyl-5-phenylpyrrole, M.P. 74°, produces (19.3) 2,4-dimethyl-5-phenylpyrrol-3-yl phenyl ketone.

EXAMPLE 20

4-isopropyl-2,5-dimethylpyrrol-3-yl phenyl ketone

A mixture of 233 g. of 2,5-dimethylpyrrole, 500 ml. of isopropanol, 225 g. of 80% potassium hydroxide and 10 ml. of water is heated in a bomb for 20 hours at 220° to 250° After cooling, the contents of the bomb are concentrated and diluted with water and ether. The ethereal layer is distilled to provide 250 g. of 3-isopropyl-2,5-dimethylpyrrole, B.P. 195–205°. The latter is converted into the phenyl ketone (20.1) through reaction with benzoyl chloride by the procedure of Example 3; M.P. 183–184°.

EXAMPLE 21

4-isobutyl-3,5-dimethylpyrrol-3-yl phenyl ketone

This compound (21.1) is prepared by the method of Example 20 using isobutanol in place of isopropanol. It melts at 190–191°.

EXAMPLE 22

4-hexyl-2,5-dimethylpyrrol-3-yl 4-fluorophenyl ketone

This compound (22.1) is prepared by the method of Example 20 using hexanol in place of isopropanol and 4-fluorobenzoyl chloride in place of benzoyl chloride.

EXAMPLE 23

4-cyclohexyl-2,5-dimethylpyrrol-3-yl phenyl ketone 2,5-dimethylpyrrole is permitted to react with cyclohexanol as described in Example 20 to produce 3-cyclohexyl-2,5-dimethylpyrrole, M.P. 118–119°. The latter is converted into the desired product (23.1) by reaction with benzoyl chloride according to the method of Example 3.

EXAMPLE 24

1-(2-chlorobenzoyl)-2,5-dimethylpyrrol-3-yl 2-chlorophenyl ketone

When the procedure of Example 1 is performed with 2-chlorobenzoyl chloride, a by-product, B.P.$_{0.25\ mm.}$ 240–250°, M.P. after crystallization from ethanol 112–114°, is obtained in addition to the compound of Example 25. The by-product (24.1) is the 1-(2-chlorobenzoyl) derivative of 2-chlorophenyl 2,5-dimethylpyrrol-3-yl ketone.

EXAMPLE 25

2-chlorophenyl 2,5-dimethylpyrrol-3-yl ketone

The product of Example 24 is heated under reflux for five hours with excess aqueous alcoholic sodium hydroxide. Dilution with water precipitates the product (25.1), M.P. 141–142°.

EXAMPLE 26

4,5-dimethyl-2-phenylpyrrol-3-yl phenyl ketone; 2-methyl-5-phenylpyrrol-3-yl phenyl ketone; 5-methyl-2-phenylpyrrol-3-yl phenyl ketone By the method of Example 1, using 2,3-dimethyl-5-phenylpyrrole instead of 2,5-dimethylpyrrole, and using benzoyl chloride instead of 4-fluorobenzoyl chloride, 4,5-dimethyl-2-phenylpyrrol-3-yl phenyl ketone is produced.

After recrystallizing twice from ethanol, the product (26.1) melts at 194–195°.

By the same method, but using 2-methyl-5-phenylpyrrole instead of 2,5-dimethylpyrrole, (26.2) 2-methyl-5-phenylpyrrol-3-yl phenyl ketone and (26.3) 5-methyl-2-phenylpyrrol-3-yl phenyl ketone, M.P. 152.5–153.5°, are obtained.

EXAMPLE 27

2,5-diallylpyrrol-3-yl phenyl and 3-fluorophenyl ketones 2,5-diallylpyrrol-3-yl phenyl ketone (27.1) is prepared by the method of Example 1, using 2,5-diallylpyrrole instead of 2,5-dimethylpyrrole, and using benzoyl chloride instead of 4-fluorobenzoyl chloride.

By the same method, but using 3-fluorobenzoyl chloride (27.2) 2,5-diallylpyrrol-3-yl 3-fluorophenyl ketone is obtained.

The diallylpyrrole was described by Hess, Chem. Ber. 46, 3128 (1913).

EXAMPLE 28

Tablet formulation incorporating 2-fluorophenyl 2,5-dimethylpyrrol-3-yl ketone

| Ingredient: | Mg./tablet |
|---|---|
| 2-fluorophenyl 2,5-dimethylpyrrol-3-yl ketone | 25 |
| Lactose USP | 100 |
| Magnesium stearate | 1.2 |
| Polyvinylpyrrolidone | 6 |
| Absolute alcohol | As required |

Blend the drug and lactose, screen through a 40-mesh screen and re-blend well. Dissolve the PVP in the alcohol and granulate the powder mass, screen through a #12 screen, dry at 110–120° F. to 1.5% moisture content. Screen through #16 screen and add the magnesium stearate (previously screened through #40 mesh). Mix well and compress into tablets.

EXAMPLE 29

Capsule formulation incorporating 2,5-dimethylpyrrol-3-yl phenyl ketone

| Ingredient: | Mg./capsule |
|---|---|
| 2,5-dimethylpyrrol-3-yl phenyl ketone | 50 |
| Cab-O-Sil | 2.5 |
| Lactose | 150 |

Mix well, screen through #60 mesh sieve and fill into two piece hard gelatin capsules.

EXAMPLE 30

Solution formulation incorporating 4-aminophenyl 2,5-dimethylpyrrol-3-yl-ketone hydrochloride

| Ingredient: | Quantity/100 ml. |
|---|---|
| 4 - aminophenyl 2,5 - dimethylpyrrol - 3 - yl ketone hydrochloride, g. | 1.5 |
| Sorbitol solution, ml. | 25 |
| Flavor, q.s. | |
| Color, q.s. | |
| Sugar syrup U.S.P., q.s. | |
| Water | As required |

Dissolve the drug in a minimum amount of water. Add the sorbitol solution, color and flavor and q.s. with sugar syrup.

EXAMPLE 31

Suppository formulation incorporating 4-methylphenyl 2,5-dimethylpyrrol-3-yl ketone

| Ingredient: | Mg./suppository |
|---|---|
| 4 - methylphenyl 2,5 - dimethylpyrrol - 3 - yl ketone | 100 |
| Cocoa butter, q.s. | |

The drug and cocoa butter are combined, mixed thoroughly and formed into 2-gram suppositories.

EXAMPLE 32

Ointment formulation incorporating 2,5-dimethylpyrrol-3-yl 4-trifluoromethylphenyl ketone

| Ingredient: | Wt./wt., percent |
|---|---|
| 2,5 - dimethylpyrrol - 3 - yl 4 - trifluoromethylphenyl ketone | 5.0 |
| Petrolatum, White, U.S.P. | 45.2 |
| Liquid petrolatum, U.S.P. | 10.0 |
| Glycerol monostearate | 8.0 |
| Methyl paraben | 0.15 |
| Propyl paraben | 0.15 |
| Isopropyl myristate | 3.0 |
| Lanolin anhydrous, U.S.P. | 20.0 |
| Sodium acetone bisulfite | 0.5 |
| Water | 8.0 |

To the melted petrolatum at 70° all the ingredients including the drug, except for the parabens, are added with constant stirring. After thorough mixing, the warm solution of paraben in water is added, and the mixture is stirred until it has reached room temperature.

It should be noted that, in addition to the ointments described hereinabove, the compounds utilized in accordance with this invention may be employed for topical administration in the form of creams, foams, or sprays.

We claim:

1. A method for alleviating inflammatory syndromes in a mammal in need of such treatment, which comprises administering to said mammal an effective amount of a compound having the formula:

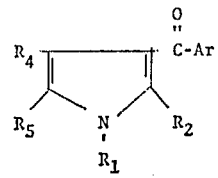

wherein $R_1$ is hydrogen; lower alkyl or cycloalkyl having no more than 6 carbon atoms; phenyl; benzyl; halo-, lower alkyl-, or lower alkoxy-substituted benzyl, the alkyl or alkoxy moieties of which have no more than 4 carbon atoms; or halo-substituted benzoyl;

$R_2$, $R_4$ and $R_5$ are hydrogen, lower alkyl, lower alkenyl or cycloalkyl having no more than 6 carbon atoms; phenyl; halophenyl; or lower alkyl phenyl or phenyl lower alkyl; the alkyl moieties of which have no more than 4 carbon atoms; and Ar is phenyl; naphthyl; biphenyl; or a mono-, di- or tri-substituted phenyl, the substituents of which are selected from the group consisting of hydroxy, lower alkyl, lower alkoxy, lower alkylenedioxy, phenoxy, nitro, halo, amino, lower alkanoylamino, benzylideneamino, lower alkylamino, di(lower alkyl)amino, ureido, lower alkylthio, phenylthio, halo lower alkyl, lower alkanoyl, lower alkyl sulfonyl, cyano, carbamoyl, N,N-di(lower alkyl)carbamoyl, lower alkoxycarbonyl, and piperidino [heterocycloamino], in which the lower alkyl, lower alkoxy, lower alkylene or lower alkanoyl moieties have no more than 4 carbon atoms.

2. The method of claim 1, wherein $R_1$ is hydrogen;

$R_2$, $R_4$ and $R_5$ are hydrogen or lower alkyl having no more than 6 carbon atoms; and Ar is phenyl or phenyl substituted by a radical selected from the group consisting of lower alkyl, lower alkoxy, halo, halo lower alkyl, or amino, in which the lower alkyl or lower alkoxy moieties have no more than 4 carbon atoms.

3. The method of claim 1, wherein the compound administered is 2,5-dimethylpyrrol-3-yl phenyl ketone.

4. The method of claim 1, wherein the compound administered is 2,4,5-trimethylpyrrol-3-yl phenyl ketone.

5. The method of claim 1, wherein the compound administered is 2-fluorophenyl 2,5-dimethylpyrrol-3-yl ketone.

6. The method of claim 1, wherein the compound administered is 3-fluorophenyl 2,5-dimethylpyrrol-3-yl ketone.

7. The method of claim 1, wherein the compound administered is 2-methylphenyl 2,5-dimethylpyrrol-3-yl ketone.

8. The method of claim 1, wherein the compound administered is 4-methoxyphenyl 2,5-dimethylpyrrol-3-yl ketone.

References Cited

Chem. Abst. 21, 381–2 (1927).

J. Chem. Soc. 102 (Abstracts), 1016 (1912).

* Spiro, Gazz. Chem. Ital. 86, pp. 95–100 (1956).

* Spiro et al., Ann. Chim. (Rome), 49, pp. 2075–2082 (1959).

Gardner et al., J. Org. Chem. 23, 823–827 (1958).

* Attorney has copies filed in this case.

STANLEY J. FRIEDMAN, Primary Examiner

U.S. Cl. X.R.

424—267